United States Patent [19]
Harrison

[11] 3,871,705
[45] Mar. 18, 1975

[54] CHAIR WITH PROJECTING HEADREST AND HARDWARE THEREFOR

[75] Inventor: Kenneth S. Harrison, Ridgefield Park, N.J.

[73] Assignee: Mohasco Industries, Inc., Amsterdam, N.Y.

[22] Filed: Oct. 23, 1973

[21] Appl. No.: 408,801

[52] U.S. Cl.................................. 297/61, 297/112
[51] Int. Cl............................................ A47c 1/02
[58] Field of Search ............. 297/61, 112, 391, 403

[56] References Cited
UNITED STATES PATENTS

| | | | |
|---|---|---|---|
| 3,132,894 | 5/1964 | Schliephacke | 297/61 |
| 3,550,952 | 12/1970 | Ferguson | 297/85 |
| 3,652,125 | 3/1972 | Rogers, Jr. | 297/61 |

Primary Examiner—Roy D. Frazier
Assistant Examiner—William E. Lyddane
Attorney, Agent, or Firm—J. B. Felshin; Marvin Feldman

[57] ABSTRACT

Headrest mounting hardware for a reclining chair having a seat and backrest which are movable relative to a base. The headrest is positioned at the rear of the backrest when the chair is in the upright position and is moved by a linkage to an operative position above the upper end of the backrest to form a continuous extension thereof. The linkage is operatively connected to the seat, backrest and base to effect this movement upon the relative movement of these parts as the backrest moves from an upright to a reclining position. The linkage includes a parallelogram linkage which causes the headrest to maintain substantially the same angular relationship to the backrest when moving from the upright to the reclining position.

15 Claims, 3 Drawing Figures

CHAIR WITH PROJECTING HEADREST AND HARDWARE THEREFOR

This invention relates to chairs with projecting headrest, and hardware therefor.

An object of this invention is to provide chair hardware of the character described comprising a seat link connected to a fixed support plate by linkage and pivoted to a backrest mounting link, which in turn, is pivoted to an intermediate portion of a headrest bellcrank on a pivot which is connected by a backrest control link to the support plate, with one end of the headrest bellcrank connected to the support plate by a headrest actuator link, and the other end of the headrest bellcrank pivoted to one end of a connecting link and the other end of the connecting link connected to an intermediate portion of a headrest drive link, and said headrest drive link pivoted at one end to said backrest mounting link, the other end of said headrest drive link pivoted to one end of a headrest bracket, the other end of said headrest bracket connected to one end of a headrest idler link, and with the other end of said headrest idler link pivoted to said headrest mounting link.

Another object of this invention is to provide hardware of the character described in which the backrest control link and the headrest actuator link cross each other.

Still another object of this invention is to provide hardware of the character described in which said headrest bellcrank has an edge adapted to engage a fixed stop pin on the connecting link to prevent pulling down the headrest bracket in the T.V. or fully reclined positions of said headrest bracket.

Yet another object of this invention is to provide hardware of the character described in which the common intermediate pivot point of said backrest mounting link and backrest control link to said headrest bellcrank is closer to the pivotal connection of said headrest actuator link to said headrest bellcrank than to the pivotal connection of said headrest bellcrank to said connecting link.

A further object of this invention is to provide hardware of the character described in which actuation of the headrest bracket is generated by relative motion of the seat link and backrest mounting link rearwardly from upright position to T.V. position. In T.V. position the headrest bracket is in extended position and virtually does not change its angular relationship to the backrest mounting link when moving from T.V. to fully reclined position. During such movement, the angle between the seat link and the backrest mounting link opens up, and there is very slight movement of the headrest relative to the backrest mounting link.

When returning the chair from fully reclined to T.V. position, the angle between the seat link and backrest mounting link closes, thereby reversing the opening of the angle when going from T.V. to fully reclined position.

Still a further object of this invention is to provide a chair of the character described in which the headrest is retracted by pressing down on the legrest of the chair by the occupant of the chair with his feet, thereby returning the chair to the upright position.

Yet a further object of this invention is to provide in a chair of the character described, means to prevent lowering movement of the lifted headrest in both T.V. and fully reclined positions, upon the occupant pushing his head against said headrest.

Yet a further object of this invention is to provide a chair of the character described in which if the chair is in T.V. position and the occupant pushes down on the legrest, the first movement of the headrest is slightly forward to release an overcenter headrest lock to produce a dwell for the headrest, because the first portion of the movement of the headrest does not take away the support of the headrest.

A still further object of this invention is to provide a strong, rugged and durable hardware of the character described which shall be relatively inexpensive to manufacture, easy to manipulate, in which the headrest bracket to which a headrest pillow may be attached, will project easily and quickly upon moving from upright to T.V. position, and which shall be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described and ow which the scope of invention will be indicated in the following claims.

Figure 1:
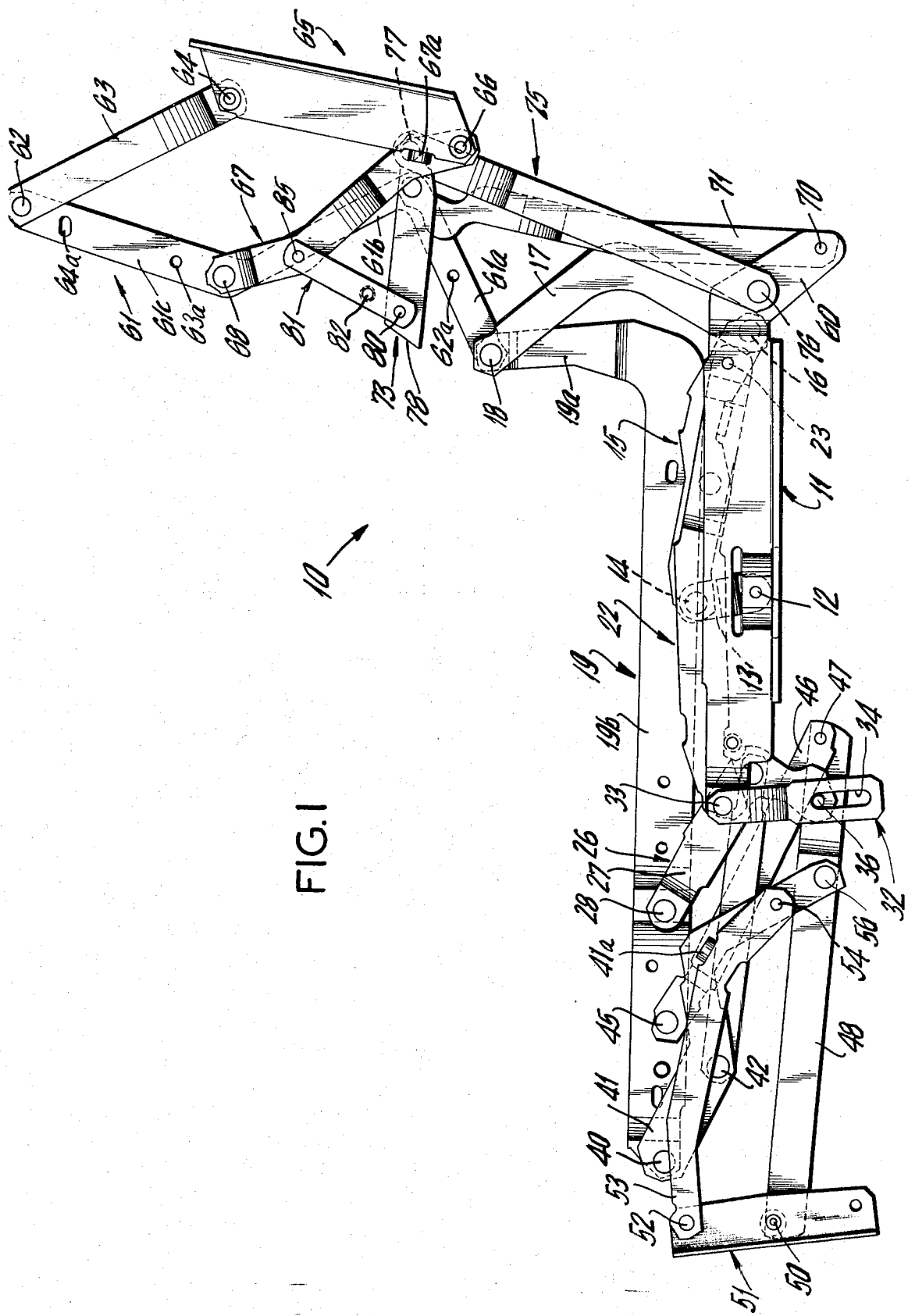
FIG. 1 is a side elevational view of chair hardware for one side of a chair embodying the invention and shown in upright or sitting position.

Referring now in detail to the drawing, 10 designates hardware for one side of a chair, it being understood that the hardware for the opposite side of the chair is similar but symmetrically disposed to the hardware shown. The hardware for the two sides are interconnected in the manner hereinafter described.

The chair hardware 10 comprises a support plate 11 fixed to a base or frame of the chair (not shown) but which can be like the base of the chair shown in U.S. Pat. No. 3,550,952. Pivoted to the support plate 11, as on pivot 12, is a short anchor link 13 pivoted, as at 14, to the front end of a lifter link 15. The rear end of the lifter link 15 is pivoted as at 16 to the front end of a rear carrier link 17. Pivoted to the rear upwardly extending end of the rear carrier link 17, as at 18, is the rear end of a seat link 19. The seat links of the hardware 10 on opposite sides of the chair are fixed to and are interconnected by a seat (not shown) but which may be like the seat shown in said U.S. Pat. No. 3,550,952.

The seat link 19 has a rear upwardly extending arm 19a and a lower forwardly extending arm 19b.

Crossing the lifter link 15 and pivoted thereto, as at 21, is another lifter link 22. The rear end of lifter link 22 is pivoted, as at 23, to said support plate 11. The forward end of lifter link 22 is pivoted, as at 25 to a bellcrank 26. Said bellcrank 26 has an arm 27 pivoted at its uppper end, as at 28, to the seat link arm 19b, rearwardly of the forward end of said arm. Said bellcrank 26 is pivoted at at 30, to ottoman driver link 31. A sequence link 32 is pivoted as at 33 to the forward end of the support plate 11. Said sequence link has a slot 34 longitudinally of its outer end. Bell crank 26 has an arm 35 at an angle to arm 27 and said arm 35 carries a pin 36 slidable in slot 34.

Pivoted to the forward end of arm 19b of the seat link 19, as at 40, is a link 41. One end of link 31, is pivoted, as at 42 to an intermediate portion of link 41.

Pivoted to arm 19b of seat link 19, between the pivot points 40 and 28, as at 45, is a link 46. The outer end of link 46 is pivoted as at 47, to one end of a link 48. The front end of link 48 is pivoted as at 50 to a leg rest bracket 51. Said leg rest bracket 51 is pivoted, as at 52, to a link 53. Said link 53 is pivoted, as at 54, to link 41. The outer end of link 41 is pivoted, as at 56, to an intermediate portion of link 48.

A stop 41a on link 41 contacts an edge of link 53 in the upright position of FIG. 1.

The legrest brackets 51 on the hardware 10 on both sides of the chair are interconnected by a legrest or footrest or ottoman (not shown), of conventional type.

The linkage comprising links 41, 46, 48, 51, 53 constitute footrest, legrest or ottoman linkage.

Said support plate 11 is formed with a downwardly and rearwardly extending arm 60 at its rear end. Pivoted to said seat link at said pivot 18 is a backrest mounting link 61. A backrest (not shown) interconnects the backrest mounting links 61 at opposite sides of the chair. Said backrest mounting link 61 comprises an arm 61a inclined upwardly and rearwardly, in the upright (sitting) position of the chair shown in FIG. 1. In said position, a second arm 61b inclines forwardly and upwardly. A third arm 61c inclines sharply upwardly and rearwardly from the upper end of arm 61b. Said backrest mounting link 61 is formed with opening 62a, 63a, 64a for receiving fasteners to attach the backrest to said backrest mounting link.

Pivoted to the upper end of arm 61c of backrest mounting link 61, as at 62, is a headrest idler link 63, which inclines rearwardly and downwardly in the upright position of the chair as shown in FIG. 1. Pivoted to the lower end of said headrest idler link 63, as at 64, is the upper end of a headrest bracket 65. Pivoted to the lower end of headrest bracket 65, as at 66, is the lower end of a headrest drive link 67. The upper end of headrest drive link 67 is pivoted, as at 68, to the backrest mounting link 61 between the arms 61b, 61c.

The headrest brackets 65 on the hardwares 10 at opposite sides of the chair are interconnected by a headrest pillow (not shown).

In the upright position of FIG. 1 such headrest pillow (not shown) is concealed inside the backrest of the chair.

Figure 2:
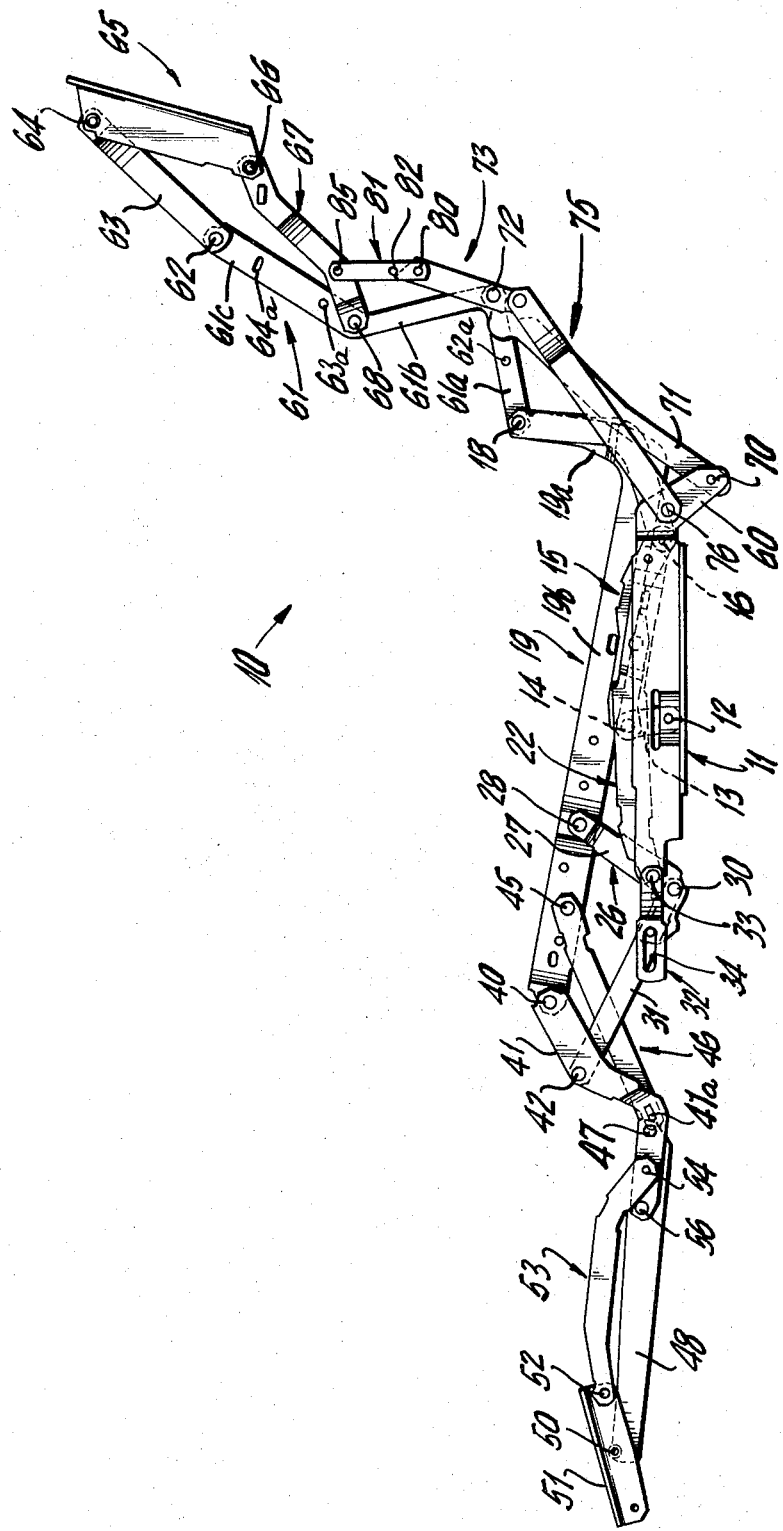
FIG. 2 is a view similar to FIG. 1 but showing the hardware in T.V. reclining position.

Highly improved means is provided for moving the headrest rearwardly, then upwardly, then forwardly, to be located at the upper end of the backrest, and forms a continuous extension of the backrest, when the backrest of the chair is moved from the upright position of FIG. 1 to the T.V. position of FIG. 2.

To this end, there is pivoted to the lower end of arm 60 of the support plate 10, as at 70, a backrest control link 71. The upper end of said link 71 is pivoted, as at 72 to the backrest mounting link 61 between the arms 61a, 61b thereof, and also to an intermediate portion of a headrest bellcrank 73. In the upright position of the chair, link 71 is substantially upright and bellcrank 73 is almost horizontal.

A headrest actuator link 75 is pivoted, as at 76, to an upper portion of arm 60. The pivot 76 is located above and forwardly of pivot 70. The upper end of said headrest actuator link 75 is pivoted to a rear outer end of bellcrank 73, as at 77. Links 71, 75 cross each other, as shown in FIG. 1 and link 75 is inclined upwardly and rearwardly relative to link 71.

The forward end edge 78 of bellcrank 73 is inclined rearwardly and forwardly in the upright position of the chair as shown in FIG. 1. The forward end of bellcrank 73 is pivoted, as at 80 to the lower end of a connecting link 81 which is inclined upwardly and rearwardly in the upright position of FIG. 1. Said connecting link 81 carries a stop pin 82 fixed to an intermediate portion thereof, in position to be contacted by edge 78 in the T.V. and fully reclined positions of FIGS. 2 and 3, respectively.

A stop lug 67a on link 67 contacts an edge of headrest bracket 65 in the lowered headrest position of FIG. 1.

The upper end of connecting link 81 is pivoted, as at 85 to an intermediate portion of said headrest drive link 67. It will be noted that pivot 72 is closer to pivot 77 than to pivot 80. It will also be noted that pivot 85 is closer to pivot 68 than to pivot 66.

In the upright position of the chair, the front end of seat link 19 cannot be raised since pin 36 is at the upper end of slot 34 and contacts the sequence link 32. During movement from upright or sitting position to T.V. position, the vertical sequence link 32 rotates in a clockwise direction about pivot 33, to horizontal position to permit movement thereafter from T.V. to fully reclined position.

Figure 3:
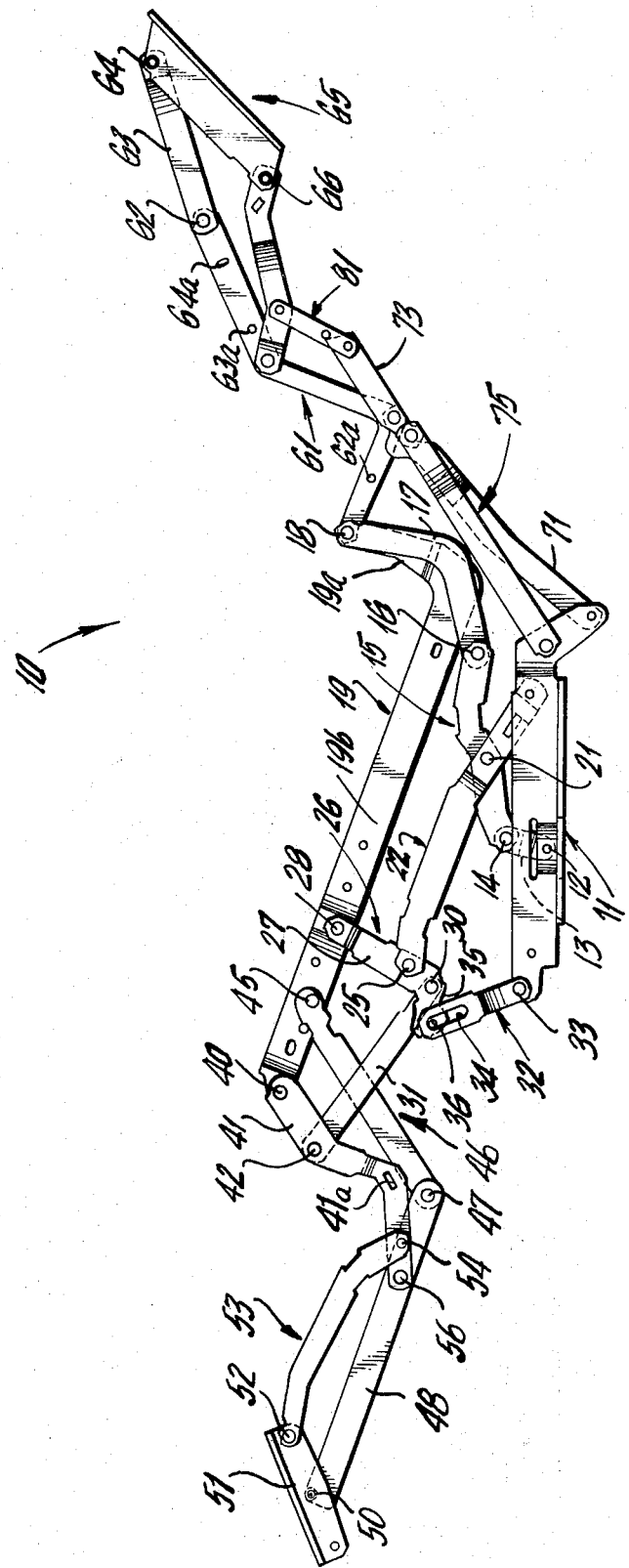
FIG. 3 shows a side view of the hardware in fully reclined position, and showing pivot 47 somewhat below link 41 so that it can be seen better.

In the upright position of FIG. 1, the footrest linkage is retracted and the headrest linkage is down. Upon pressing back on the backrest, seat link 19 and backrest mounting link 61 move back causing links 71, 75 to rotate in a clockwise direction to the T.V. FIG. 2 position, thereby projecting the legrest linkage and causing the headrest bellcrank 73 to rotate in a clockwise direction about pivot 72 to quickly raise the connecting link 81 which in turn, quickly rotates the headrest drive link 67 about pivot 68. Arm 61c of backrest mounting link 61, drive link 67, headrest bracket 65 and idler link 63 form a parallelogram linkage. Its movement from upright to T.V. position, causes a concealed pillow (not shown) at the front of headrest brackets 65, to move rearwardly out of a backrest (not shown) of the chair, then upwardly and then forwardly so as to form an extension of such backrest (now shown) above its upper end. The connecting link 81 and the headrest bellcrank 73 form an overcenter lock for the headrest parallelogram linkage. In FIGS. 2 and 3 it will be seen that the pivot 80 has passed a line connecting pivots 72 and 85. Thus the distance from pivot 72 to 85 increased and then slightly decreased. To bring the headrest down, it must first go up slightly and then down, giving a dwell for headrest before it goes down. The lowering of the headrest and movement from T.V. to upright is accomplished by the occupant pushing down on the legrest with his feet. The edge 78 of bellcrank 73 will contact stop pin 82 to prevent lowering of the headrest without moving from T.V. back to upright position.

The overcenter lock prevents accidental collapse or lowering of the headrest except when moving from T.V. back to upright positions.

Actuation of the headrest bracket is generated by relative motion of the seat link and backrest mounting link rearwardly from upright position to T.V. position. In T.V. position the headrest is in extended position and virtually does not change its angular relationship to the backrest mounting link when moving from T.V. to fully reclined position. During such movement, the angle between the seat link and the backrest mounting link opens up, and there is very slight movement of the headrest relative to the backrest mounting link.

When returning the chair from full, reclined to T.V. position, the angle between the seat link and backrest mounting link closes, thereby reversing the opening of the angle when going from T.V. to fully reclined position.

When going from T.V. to upright position, the headrest is retracted by pressing down on the legrest of the chair by the occupant of the chair with his feet.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative.

I claim:

1. Chair hardware, comprising a seat link, a support plate adapted to be fixed to the base of a chair, linkage connecting the seat link to said support plate, a backrest mounting link pivoted to said seat link, a headrest idler link pivoted to said backrest mounting link, a headrest bracket pivotally connected to said idler link, a headrest drive link pivotally connecting said headrest bracket with said backrest mounting link, a headrest bellcrank pivoted mediately the ends thereof, to said backrest mounting link, a connecting link connecting one end of said headrest bellcrank with said headrest drive link, a backrest control link pivoted at its lower end to said support plate and at its upper end to the pivotal connection of said headrest bellcrank to said backrest mounting link, and a headrest actuator link pivoted at its lower end to said support plate and at its upper end of the other end of said headrest bellcrank, said backrest mounting link, said headrest idler link, said headrest bracket and said headrest drive link forming a parallelogram linkage.

2. The combination of claim 1, the pivotal connection of said backrest control link to said support plate being located below and rearwardly of the pivotal connection of said headrest actuator link to said support plate.

3. The combination of claim 1, said backrest control link and said headrest actuator link crossing each other.

4. The combination of claim 3, with said headrest actuator link being inclined in an upward and rearward direction relative to said backrest control link.

5. The combination of claim 1, the pivotal connection of said backrest mounting link to said backrest control link and to said headrest bellcrank being closer to the pivotal connection of said headrest bellcrank to said headrest control link than to the connection of said headrest bellcrank to said connecting link.

6. The combination of claim 5, and the pivotal connection of said connecting link to said headrest drive link being closer to the pivotal connection of said headrest drive link to said backrest mounting link than to the pivotal connection of said headrest drive link to said headrest bracket.

7. The combination of claim 1, said headrest bellcrank having an edge, and a stop on said connecting link adapted to be contacted by said edge of said headrest bellcrank to limit relative rotation between said bellcrank and connecting link in one direction.

8. The combination of claim 1, the pivotal connection of said backrest control link to said support plate being located below and rearwardly of the pivotal connection of said headrest actuator link to said support plate, said backrest control link and said headrest actuator link corssing each other.

9. The combination of claim 8, with said headrest actuator link being inclined in an upward and rearward direction relative to said backrest control link.

10. The combination of claim 9, the pivotal connection of said backrest mounting link and said backrest control link to said headrest bellcrank being closer to the pivotal connection of said headrest bellcrank to said headrest actuator link than to the pivotal connection of said headrest bellcrank to said connecting link.

11. The combination of claim 10, and the pivotal connection of said connecting link to said headrest drive link being closer to the pivotal connection of said headrest drive link to said backrest mounting link than to the pivotal connection of said headrest drive link to said headrest bracket.

12. The combination of claim 11, said headrest bellcrank having an edge, and a stop on said connecting link adapted to be contacted by said edge of said headrest bellcrank to limit relative rotation between said headrest bellcrank and connecting link in one direction.

13. The combination of claim 1, with said headrest actuator link being inclined in an upward and rearward direction relative to said backrest control link.

14. The combination of claim 13, the pivotal connection of said backrest mounting link and said backrest control link to said headrest bellcrank being closer to the pivotal connection of said headrest bellcrank to said headrest actuator link than to the pivotal connection of said headrest bellcrank to said connecting link.

15. The combination of claim 1, said connecting link and headrest bellcrank forming an overcenter lock for said parallelogram linkage, with the pivotal connection between the headrest bellcrank and the connecting link passing rearwardly through a centerline from the pivotal connection of said headrest bellcrank to said backrest mounting link, to the pivotal connection of said mounting link to said headrest drive link, upon swinging the backrest mounting link about its pivotal connection to the seat link, rearwardly from the upright sitting position of said backrest mounting link, to a reclining position of said backrest mounting link.

* * * * *